United States Patent
Kanehira

(10) Patent No.: US 7,223,018 B2
(45) Date of Patent: May 29, 2007

(54) BIAXIAL LINEAR-REVOLVING POSITION CONTROL AND TABLE SYSTEM USING THE SAME

(75) Inventor: Masayuki Kanehira, Gifu-ken (JP)

(73) Assignee: Nippon Thompson Co., Ltd., Tokyo (JP)

(*) Notice: Subject to any disclaimer, the term of this patent is extended or adjusted under 35 U.S.C. 154(b) by 526 days.

(21) Appl. No.: 10/799,753

(22) Filed: Mar. 15, 2004

(65) Prior Publication Data
US 2004/0187743 A1   Sep. 30, 2004

(30) Foreign Application Priority Data
Mar. 31, 2003  (JP) .............................. 2003-095825

(51) Int. Cl.
*F16C 29/06* (2006.01)
(52) U.S. Cl. .............................. 384/9; 384/45; 384/447
(58) Field of Classification Search ............ 384/9, 384/45, 44, 43, 447
See application file for complete search history.

(56) References Cited

FOREIGN PATENT DOCUMENTS

| JP | 93757  | 4/1996  |
|----|--------|---------|
| JP | 99243  | 4/1996  |
| JP | 245128 | 9/1999  |
| JP | 300557 | 11/1999 |

*Primary Examiner*—Lenard A. Footland
(74) *Attorney, Agent, or Firm*—Browdy and Neimark, PLLC

(57) ABSTRACT

A biaxial linear-revolving guide unit is disclosed, which is comprised of a pair of linear motion guide units each composed of a guide rail and a slider fit over the guide rail, and a revolving bearing installed between the linear motion guide units to joint them for revolving movement relative to one another. The revolving bearing is composed of an outer ring, an inner ring and rolling elements. The inner ring is joined directly to the slider of any one linear motion guide unit while the outer ring is joined directly to the other linear motion guide unit. A table system compact in construction is provided, in which more than one the biaxial linear-revolving guide unit is installed between a moving table and a stationary bed.

21 Claims, 16 Drawing Sheets

BIAXIAL LINEAR-REVOLVING POSITION CONTROL AND TABLE SYSTEM USING THE SAME

FIELD OF THE INVENTION

The present invention relates to a position control with onboard paired linear motion guide units and a revolving bearing adapted well to, for example precise position control of a table, and a table system using the position control to make a stage move any desired position in any direction of X-, Y- and θ-directions.

BACKGROUND OF THE INVENTION

A position control to move a table in longitudinal, traverse and circular directions is disclosed in Japanese Patent Laid-Open No. 99243/1996, which has three bearing units to allow a table moving relative to a stationary bed in any direction of X-, Y- and circular directions. Each bearing unit is composed of a pair of linear motion guide units that are each made up of a guide member and a moving member, which is jointed for rotation with another moving member of the counterpart. Any two bearing units lie in parallel relation with one another between the stationary bed and the table while the third one is arranged in perpendicular to the two bearing units. The bearing units are each provided with a linear moving mechanism composed of a ball screw, a lead nut and a motive source.

Another prior position control of biaxial linear-revolving guide means disclosed in Japanese Patent Laid-Open No. 245128/1999, which has biaxial linear guide means composed of a first guide rail and a second guide rail arranged in perpendicular to the first guide rail and connected with the first guide rail through a moving carriage, and a circular guide means made in the second guide rail. Some biaxial linear-revolving guide means recited earlier are disposed between a stationary bed and a table and associated with one another by any linear driving mechanism to form a biaxial linear-revolving table system. The circular guide means is provided therein with a crossed-roller bearing and associated with the second guide rail using any joint member. The biaxial linear-revolving guide means has any driving mechanism.

A prior table system disclosed in Japanese Patent Laid-Open No. 300557/1999 has a turning mechanism disposed between first and second carriages.

In Japanese Patent Laid-Open No. 93757/1996, moreover, there is disclosed a crossed-roller bearing composed of an inner ring, an outer ring surrounding the inner ring, and more than one roller installed between the inner and outer rings. Both the inner and outer rings are made on axially opposing ends thereof with threaded holes, which are used to fasten the bearing to any desired component including a housing, spindle and so on. The crossed-roller bearing, however, is envisaged to keep lubricant against any leakage through a plug while contain vibration that might be otherwise caused in the plug by rolling motion of the rollers. The outer ring is fastened to the stationary housing while the inner ring is bolted to the spindle. Nevertheless, the inner and outer rings have no construction to directly mount them to the slider of the linear motion guide unit.

Now referring to FIG. 25, there is shown an example of prior linear motion guide units commonly known to those skilled the art. The prior linear motion guide unit is mainly comprised of an elongated guide rail 72 and a slider 71 that fits over and conforms to the guide rail 72 for linear movement. The guide rail 72 is made on widthwise opposing sides thereof with lengthwise raceway grooves 73, one to each side. The slider 71 is allowed to move along the guide rail 72 in sliding way by virtue of rolling elements 79. The guide rail 72 is made on a lengthwise upper surface 74 thereof with holes 75 that are arranged lengthwise at a fixed interval. The guide rail 72 is fastened down to any mounting base such as a bed, machine bed, working bench, and so on with fastening bolts that extend through the holes 75 in the guide rail 72 to be screwed into the threaded holes in the mounting base. The slider 71 includes a carriage 76 made with raceway grooves 80 in opposition to the raceway grooves 73 on the guide rail 72, and end caps 77 secured to forward and aft ends of the carriage 76, one to each end. The carriage 76 is provided on an upper surface thereof with bolt holes 78 that are used to fasten any other appliance, machine component, chuck, clamping jaw, and so on to the slider 71. The rolling elements 79, as they roll, are allowed to recirculate through load races defined between the opposed raceway grooves 73, 80, turnaround races in the end caps 77 and return passages 81 extending in the carriage 76. Moreover, retainer bands 85 are attached to the carriage 76 to embrace the rolling elements 79 lest they fall away from the carriage 76. Also mounted on the end caps 77 are end seals 84, one to each end cap, for keeping sealing function between the guide rail 72 and the lengthwise opposing forward and aft ends of slider 71.

For the application of the linear motion guide unit to the table system where the table is allowed to move linearly in biaxial directions and also turn in circular direction as recited earlier, joining the moving member, or the slider, for revolving movement with one another is commonly done with just one shoulder bolt through the bearing. Such prior revolving joint, because of easy to be lopsided when having undergone any moment of load, is unsteady and, therefore, is not ready for the table system that needs precise position-control.

With the prior biaxial linear-revolving guide means in which the revolving guide means is secured to the table system through the joint member as stated earlier, the precise table system needs many components that are made with accuracy and very tough to assemble them into the table system. Besides, since the revolving guide means is rigidly connected to the second guide rail, any movement of the second guide rail results in entailing the simultaneous movement of the revolving guide, getting the center of the revolving guide means to move past away from the first guide rail into off-alignment where the table system would come into unsteady situation to get worse in precise position-control.

Further, the conventional table systems as stated earlier, because the revolving guide means fits through the joint member, is much tough to provide the table system that can make position control with highly accuracy.

SUMMARY OF THE INVENTION

It is the primary object of the present invention to overcome the major problem associated in current biaxial linear-revolving guide means as described just above and especially to provide a biaxial linear-revolving guide means in which a revolving bearing fits directly between opposite sliders of the paired linear motion guide units, thereby resulting in reduction in number of part or component required and shrinkage in construction, and further to provide a table system in which some biaxial linear-revolving guide means are installed between a moving table and a stationary bed to make certain of precise position-control of the table relative to the stationary bed in any direction of X-, Y- and θ-directions.

The present invention is concerned with a biaxial linear-revolving guide unit comprising a pair of linear motion guide units each composed of a guide rail and a slider fit over the guide rail for linear movement relative to the guide rail, and a revolving bearing installed between the linear motion guide units to joint them for revolving movement relative to one another, wherein the revolving bearing is comprised of an inner ring, an outer ring fit over the inner ring for revolving movement relative to the inner ring, and a rolling element installed between the inner and outer rings, and wherein any one of the inner and outer rings is joined directly at any one of axially opposite ends thereof to the slider of any one linear motion guide unit while the other of the inner and outer rings is joined directly at any one of axially opposite ends thereof to the slider of the other linear motion guide unit.

In one aspect of the present invention, a biaxial linear-revolving guide unit is provided in which the paired linear motion guide units are a first linear motion guide unit composed of a first guide rail and a first slider, and a second linear motion guide unit composed of a second guide rail and a second slider.

In another aspect of the present invention, a biaxial linear-revolving guide unit is provided in which a space adjuster to regulate a clearance between the linear motion guide units is provided on a surface of the slider, which faces any one of axially opposite mating surfaces of the revolving bearing. Moreover, there is provided a biaxial linear-revolving guide unit in which the inner and outer rings are joined by four pieces of fastening bolt together with the mating surfaces of the sliders, which are each side opposite to other side that faces the associated guide rail.

In another aspect of the present invention, a biaxial linear-revolving guide unit is provided, in which the inner ring of the revolving bearing is made with a counter-bored hole into which a fastening bolt fits to join the inner ring to any one of the sliders while the outer ring of the revolving bearing is made with a threaded hole into which a threaded bolt, after having extended through a hole in the other slider, fits to fasten the outer ring to the other slider.

In another aspect of the present invention, a biaxial linear-revolving guide unit is provided, in which the revolving bearing is constituted with a crossed-roller bearing composed of the inner ring, outer ring and more than one rolling element, which are all assembled into an integral construction. Moreover, there is provided a biaxial linear-revolving guide unit in which the crossed-roller bearing is constructed in such a way that the inner ring fits into the outer ring to shift one another in an axial direction, whereby a mounting surface of the inner ring facing onto a mating surface of the first slider is raised above the outer ring while a mounting surface of the outer ring facing onto a mating surface of the second slider is raised above the inner ring in an axially opposite direction.

In another aspect of the present invention, a biaxial linear-revolving guide unit is provided, in which any one of the guide rails is joined to a bed of rectangular configuration while the other is joined to a table of rectangular configuration. To this end, the guide rail to be joined with the table is made with a threaded hole and a fastening bolt, having passing through a hole in the table, fits into the threaded hole.

In another aspect of the present invention, there is provided a biaxial linear-revolving guide unit in which the linear motion guide unit joined to the table is combined with a driving means for position control of the slider.

In another aspect of the present invention, there is provided a biaxial linear-revolving guide unit in which the linear motion guide unit has the guide rail made in a U-shape in transverse section of sidewise opposing side walls joined together with a bottom wall, and the slider fit for linear movement between the side walls of the guide rail. As an alternative, the linear motion guide unit has the guide rail of rectangular shape in transverse section, and the slider fit for linear movement over the guide rail.

In another aspect of the present invention, there is provided a biaxial linear-revolving guide unit in which the bed and the table each have a surface of reference, which is used to locate accurately the guide rail of the associated linear motion guide unit, and wherein the surface of reference is constituted with either a side surface of reference inside a groove cut into any one of the bed and the table or any one of a fixed block and a fixed pin of reference, which is fastened to any one of the bed and the table.

In a further another aspect of the present invention, there is provided a table system in which more than one biaxial linear-revolving guide unit is installed between a table of rectangular configuration and a bed of rectangular configuration in opposition to the table, and wherein the bed is provided thereon with a first X-axis installation area where any one of the linear motion guide units is joined to the bed with the guide rail thereof extending in an X-direction, and a first Y-axis installation area extending in a Y-direction normal to the X-direction, while the table is provided thereon with a second Y-axis installation area where the other linear motion guide unit is joined to the table with the guide rail thereof extending in the Y-direction normal to the first X-axis installation area, and a second X-axis installation area extending in the X-direction normal to the first Y-axis installation area.

In another aspect of the present invention, there is provided a table system in which a pair of the first X-axis installation areas is provided on the bed in such a way spaced away from one another in the Y-direction while a pair of the second X-axis installation areas is provided on the table in such a way spaced away from one another in the X-direction, and wherein the guide rails of the linear motion guide units fit in the first and second X-axis installation areas, one to each area.

In another aspect of the present invention, there is provided a table system in which the first Y-axis installation area is in line in the Y-direction on the bed while the second Y-axis installation area is in line in the Y-direction on the table, and wherein the guide rails of the paired linear motion guide units fit in the first and second Y-axis installation areas, one pair to each area.

In another aspect of the present invention, there is provided a table system in which the first X-axis installation area, second X-axis installation area, first Y-axis installation area and second Y-axis installation area each have a surface of reference, which is used to locate the guide rail of the associated linear motion guide unit, and wherein the surface of reference is constituted with either a side surface of reference inside a groove cut into any one of the bed and the table or any one of a fixed block and a fixed pin of reference, which is fastened to any one of the bed and the table.

In another aspect of the present invention, there is provided a table system in which the linear motion guide unit installed on the bed is comprised of the guide rail made in a U-shape in transverse section of sidewise opposing side walls joined together with a bottom wall, and the slider fit for linear movement between the side walls of the guide rail, while the other linear motion guide unit is composed of the guide rail of rectangular shape in transverse section, and the slider fit for linear movement over the guide rail.

In another aspect of the present invention, there is provided a table system in which of the linear motion guide units installed on the bed, three the units are combined with the driving means, one to each unit, to force the table towards any desired location relative to the bed.

In another aspect of the present invention, there is provided a table system in which the three driving means serves as a first X-axis driving means, a second X-axis driving means and a Y-axis driving means, respectively, which are selectively actuated to control not only an amount of movement but also a direction of movement of the table, thereby getting the table to move relative to the bed towards any desired location in any mode of X-direction moving mode, and Y-direction moving mode, or askew moving mode in XY-coordinates, turning mode on its center axis and angular shift mode on an axis of moment vector in XY-coordinates.

With the position-control system of the table system constructed as stated earlier, the biaxial linear-revolving guide unit makes it possible to provide the table system high in precision, even with simple in construction. The biaxial linear-revolving guide unit in which the revolving bearing is joined directly to the sliders of the linear motion guide units helps not only reduce the overall height of the table system, rendering the table system compact in construction, but also increase the stiffness between the paired linear motion guide units, making certain of the accuracy in operation of the table system in which the biaxial linear-revolving guide unit is assembled. With the biaxial linear-revolving guide unit in which the revolving bearing is interposed between the confronting sliders to allow the sliders turning relative to one another, moreover, since the sliders are always kept in alignment with a center of revolution, the linear motion guide unit experiences no variation in the center of loads and, therefore, is hard to undergo any lopsided load.

With the biaxial linear-revolving guide unit where any one slider of a pair of linear motion guide units is joined directly to the inner ring of the revolving bearing while the other slider is joined directly to the outer ring of revolving bearing, there is no need of any bearing housing used in conventional constructions. Thus, the biaxial linear-revolving guide unit itself can be made reduced in the overall height and in number of part or component required and shrinkage in construction. Moreover, the biaxial linear-revolving guide unit is allowed to include a space adjuster on any mating surface of the sliders to make it easier to adjust the height of the guide unit. With the table system of three-point mounting construction using at least three sets of the biaxial linear-revolving guide unit, the position-control system can be provided which is high in stiffness and in travel precision when the table is moved, and further makes it possible to ensure the large amount of table travel in compliance with the design considerations. According to the table system of the present invention, the position control of the table relative to the bed in any direction of X-, Y- and θ-directions can be realized accurately by any suitable software or program control to move the table towards any desired position.

Other objects and features of the present invention will be more apparent to those skilled in the art on consideration of the accompanying drawings and following specification wherein are disclosed preferred embodiments of the invention with the understanding that such variations, modifications and elimination of parts may be made therein as fall within the scope of the appended claims without departing from the spirit of the invention.

DETAILED DESCRIPTION OF THE PREFERRED EMBODIMENTS

Preferred embodiments of a biaxial linear-revolving guide unit according to the present invention and a table system using the same will be explained hereinafter in detail with reference to the accompanying drawings.

Figure 1:
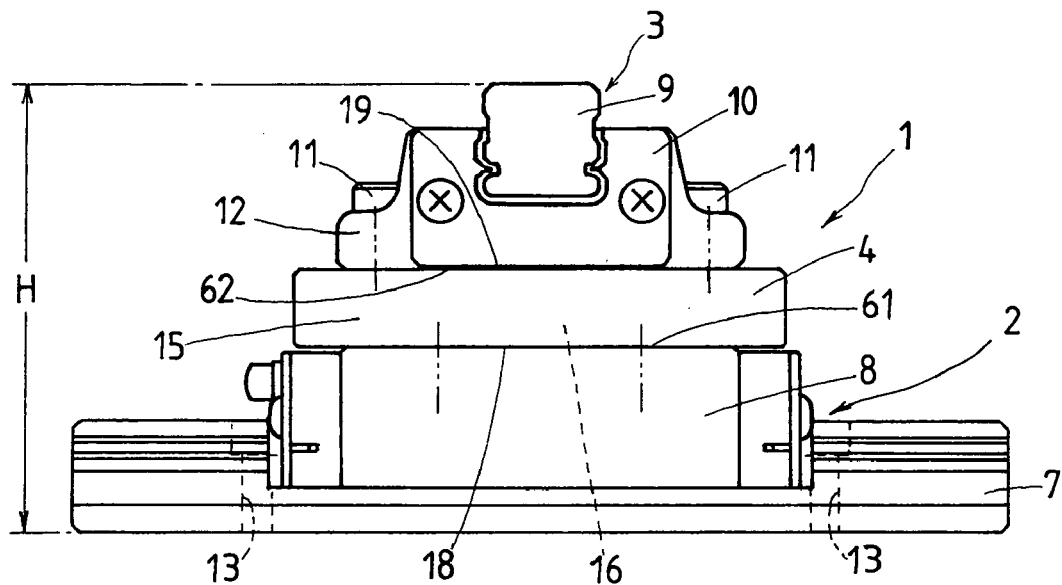
FIG. 1 is a front elevation showing a preferred embodiment of a biaxial linear-revolving guide unit according to the present invention.
Figure 2:
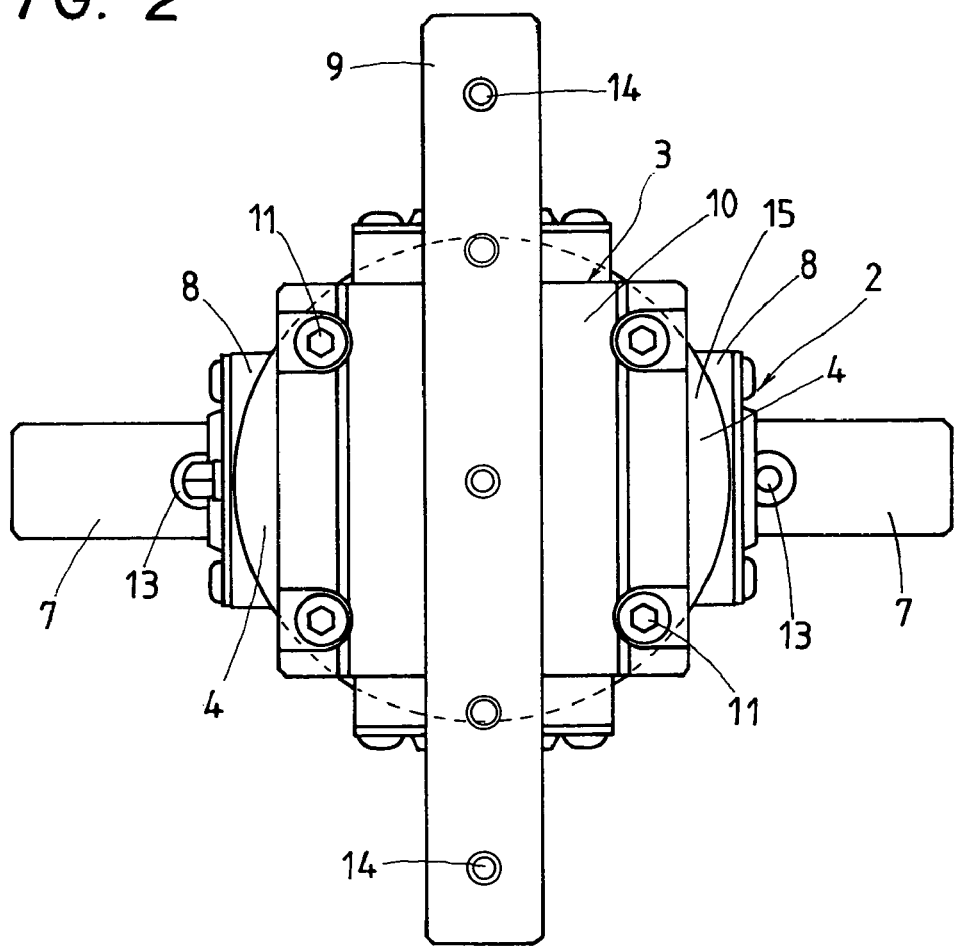
FIG. 2 is a top plan view of the biaxial linear-revolving guide unit illustrated in FIG. 1.
Figure 3:
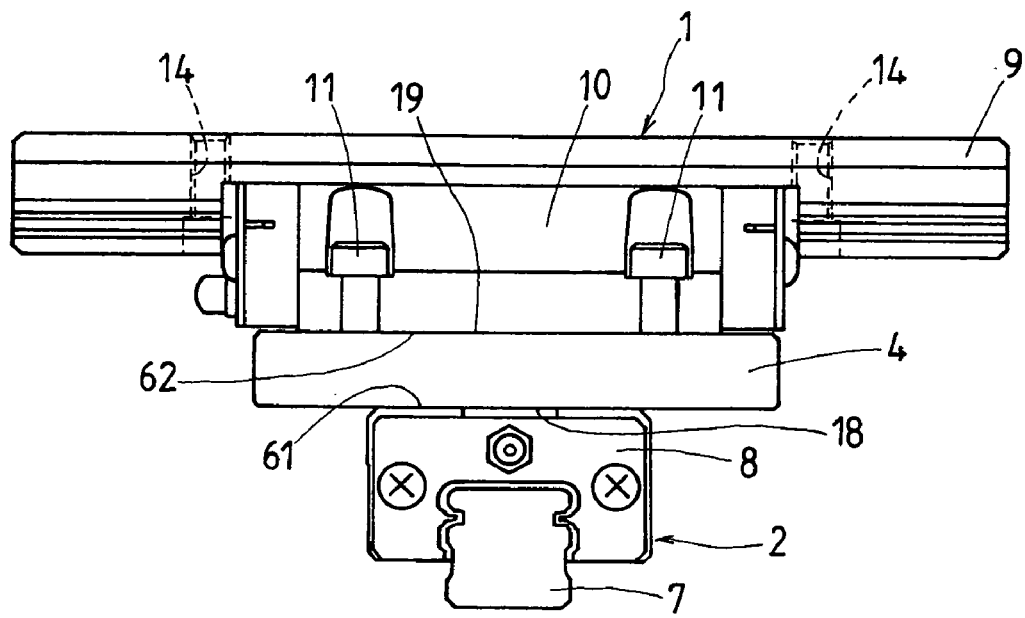
FIG. 3 is a side elevation of the biaxial linear-revolving guide unit of FIG. 1.
Figure 25:
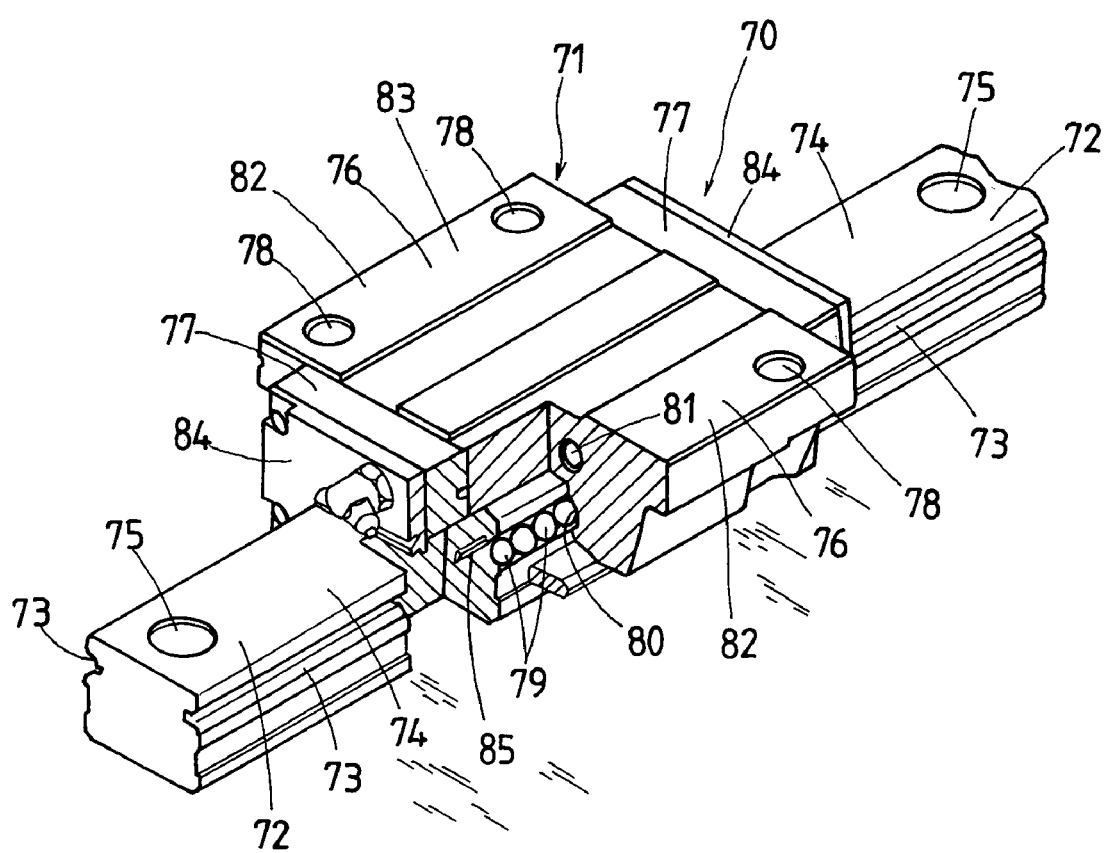
FIG. 25 is a perspective view, partially cut away, of a conventional linear motion guide unit.

First referring to FIGS. 1 to 3, there is shown a biaxial linear-revolving guide unit 1 according to the present invention. The biaxial linear-revolving guide unit 1 is chiefly comprised of a pair of linear motion guide units 2, 3, and a revolving bearing 4 installed between the linear motion guide units 2 and 3. Especially, the biaxial linear-revolving guide unit 1 features that the revolving bearing 4 is joined directly with each slider 8, 10 of the linear motion guide units 2 and 3. The first linear motion guide unit 2 is made up of a first guide rail 7 and a first slider 8 while the second linear motion guide unit 3 is made up of a second guide rail 9 and a second slider 10. The linear motion guide units 2, 3 themselves are equivalent in construction to the guide unit as shown in, for example FIG. 25 and, therefore, the guide rails 7, 9 and the sliders 8, 10 may be constructed, for example as stated earlier with reference to FIG. 25.

Figure 5:
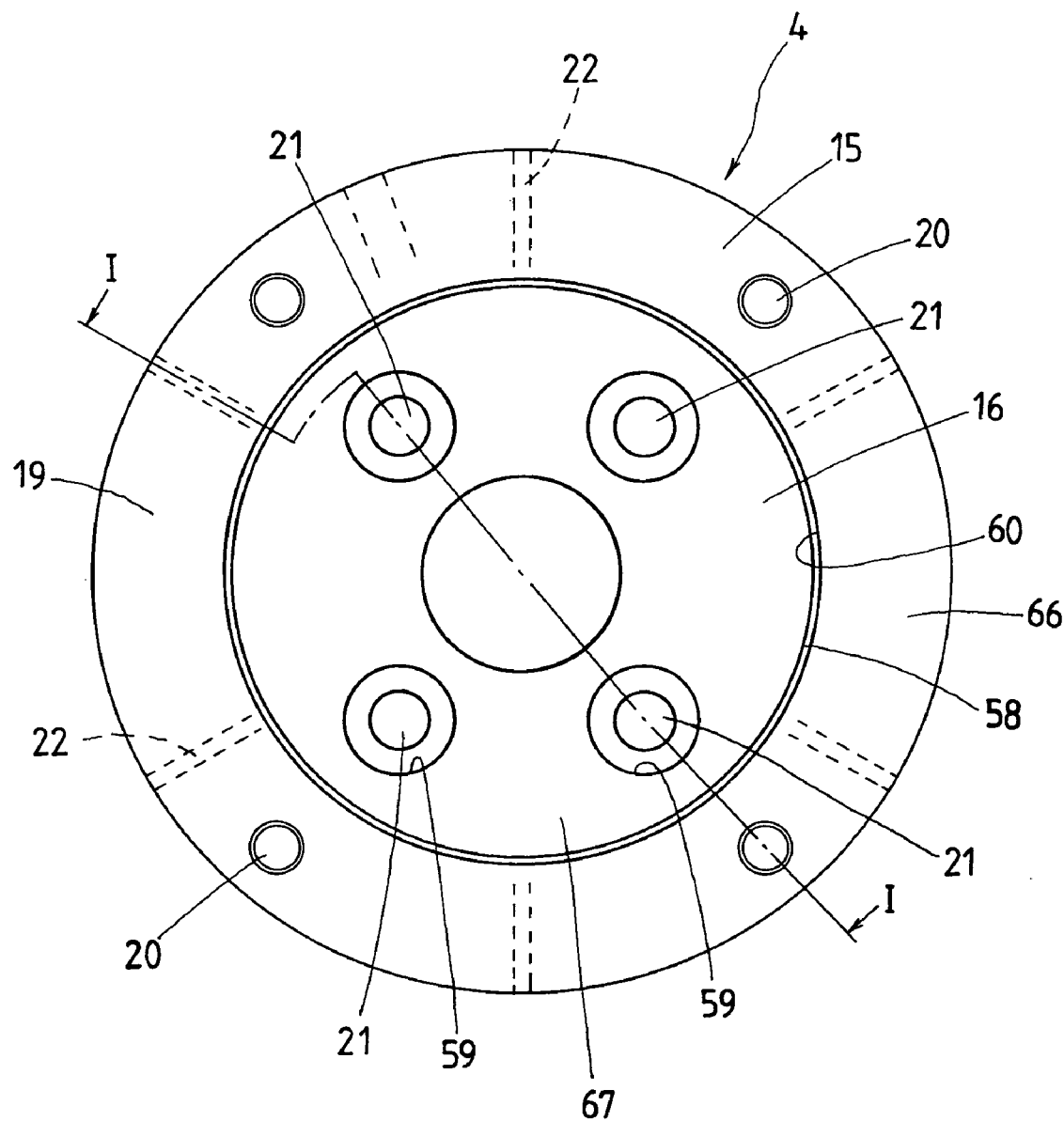
FIG. 5 is a front elevation of a revolving bearing in the biaxial linear-revolving guide unit of FIG. 1 according to the present invention.
Figure 6:
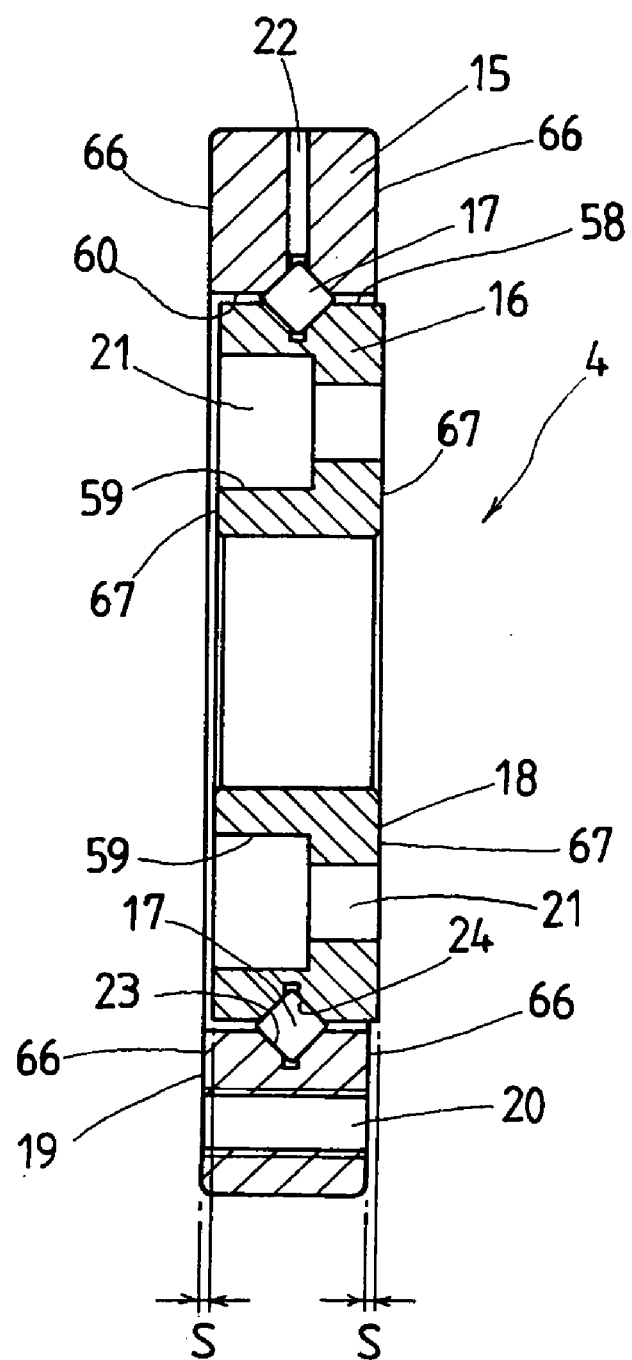
FIG. 6 is a transverse sectional view of the revolving bearing, the view being taken on the plane of the lines I—I of FIG. 5.

The revolving bearing 4, as illustrated in FIGS. 5 and 6, is constructed with a crossed-roller bearing composed of an outer ring 15 made therein with oil holes 22, an inner ring 16 fit in the outer ring 15 for rotation relative to the outer ring 15, and more than one rolling element of a roller 17. The outer ring 15 is made along an inside circular surface 60 thereof with a raceway groove 23 of V-shape in transverse section while the inner ring 16 is also made along an outside circular surface 58 thereof with a raceway groove 24 of V-shape in transverse section. The rollers 17 are held in a circular race defined between the raceway grooves 23, 24 in such a way lying in the circular race with their own axes intersecting alternately one another. With the crossed-roller bearing used for the revolving bearing 4, the inner and outer rings 15, 16 are not split to assemble the rollers 17 between them, but made integral having an access area to introduce the rollers 17 in the race. The crossed-roller bearing can carry any load in rotation moment and in every direction, either radial or axial. Moreover, the crossed-roller bearing for the revolving bearing is constructed in such a way that the rollers fit into the race with undergoing a preselected prestress to cause no clearance between the rollers 17 and any of the inner and outer rings.

The inner ring 16 is made with a bolt hole 21, which is counter-bored at 59. A fastening bolt 11 fits into the bolt hole 21 to secure the inner ring 16 onto a flat top surface 18 of the first slider 8 on the first guide rail 7, the flat top surface 18 providing a surface of reference to mount the crossed-roller bearing to the first slider 8. Although four bolt holes 21 are shown in FIG. 5, more than one bolt hole 21 is made in line with a female threaded hole in the slider 8. In contrast, the outer ring 15 is made with a female threaded hole 20, into which a fastening bolt 11 is driven to secure the outer ring 15 onto a flat bottom surface 62 of the second slider 10 on the second guide rail 9, the flat bottom surface 62 providing a surface of reference to mount the crossed-roller bearing to the second slider 10. More than one threaded hole 20, for example four threaded holes 20 shown in FIG. 5, is spaced circularly in alignment with a bolt hole in the slider 10.

With the revolving bearing 4 constructed as stated earlier, the inner ring 16 fits into the outer ring 15 in such a way they get shift or offset slightly one another in an axial direction. Thus, a mounting surface 18 of the inner ring 16 facing onto the mating surface 61 of the first slider 8 is raised above the outer ring 15 while a mounting surface 19 of the outer-ring 15 facing onto the mating surface 62 of the second slider 10 is raised above the inner ring 16 in an axially opposite direction. The slight shift or offset of the inner ring 16 relative to the outer ring 15 in axial direction results in leaving a bit of gap S, for example a matter of from 0.2 to 0.5 mm, between the mounting surface 18 of the inner ring 16 and an axial end surface 66 of the outer ring 15 to avoid any interference, which might be otherwise caused from the axial end surface 66 of the outer ring 15 after the mounting surface 18 on any one axial end surface 67 of the inner ring 16 has come into engagement with the mating surface 61 of the first slider 8. It will be understood that the same is true for another axial end surface facing on to the second slider 10, which is in axially opposition to the end surface facing on to the first slider 8. That is to say, there is left a slight gap S in axial height, for example a matter of from 0.2 to 0.5 mm, between the mounting surface 19 of the outer ring 15 and an axial end surface 67 of the inner ring 16 to avoid any interference, which might be otherwise caused from the axial end surface 67 of the inner ring 16 after the mounting surface 19 on another axial end surface 68 of the outer ring 15 has come into engagement with the mating surface 62 of the second slider 10.

Figure 4:
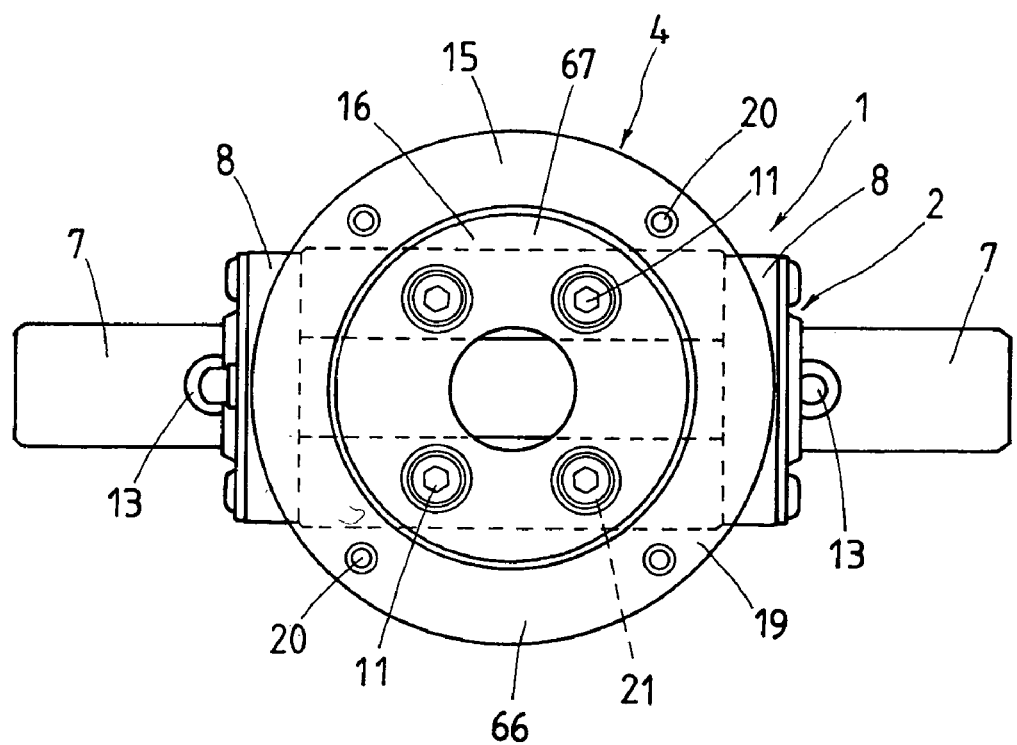
FIG. 4 is a top plan view of the biaxial linear-revolving guide unit of FIG. 1, but an upper linear motion guide unit being removed.

Assembly of the linear motion guide units 2, 3 and the revolving bearing 4 into the biaxial linear-revolving guide unit according to the present invention can be carried out accurately, with even ease, by following simple procedures as stated just later. The inner ring 16 of the revolving bearing 4, as shown in FIG. 4, is first attached using the fastening bolt 11 to the first slider 8 of the first linear motion guide unit 2. Then, the outer ring 15 of the revolving bearing 4, as shown in FIG. 2, is secured using the fastening bolt 11 to the second slider 10 of the second linear motion guide unit 3. The sliders 8, 10 are made somewhat different in configuration from one another to finish the biaxial linear-revolving guide unit 1 in compliance with the assembly procedures as stated earlier. The second slider 10 mating with the outer ring 15, as shown in FIG. 1, is made integrally extended with sidewise flanges 12 to provide the mating surface 62 that can afford to make abutment against the outer ring 15. The first slider 8, contrary to the second slider 10, has no sidewise flanges to provide the mating surface 61 that is relatively slim or narrow in width.

The first guide rail 7, as shown in FIGS. 1 and 2, is made with bolt holes 13, which are used to fasten the guide rail 7 to any other component, while the second guide rail 9 is also made with threaded holes 14 as shown in FIGS. 3 and 4, which allow to fasten the guide rail 9 to any other component from above.

Figure 7:
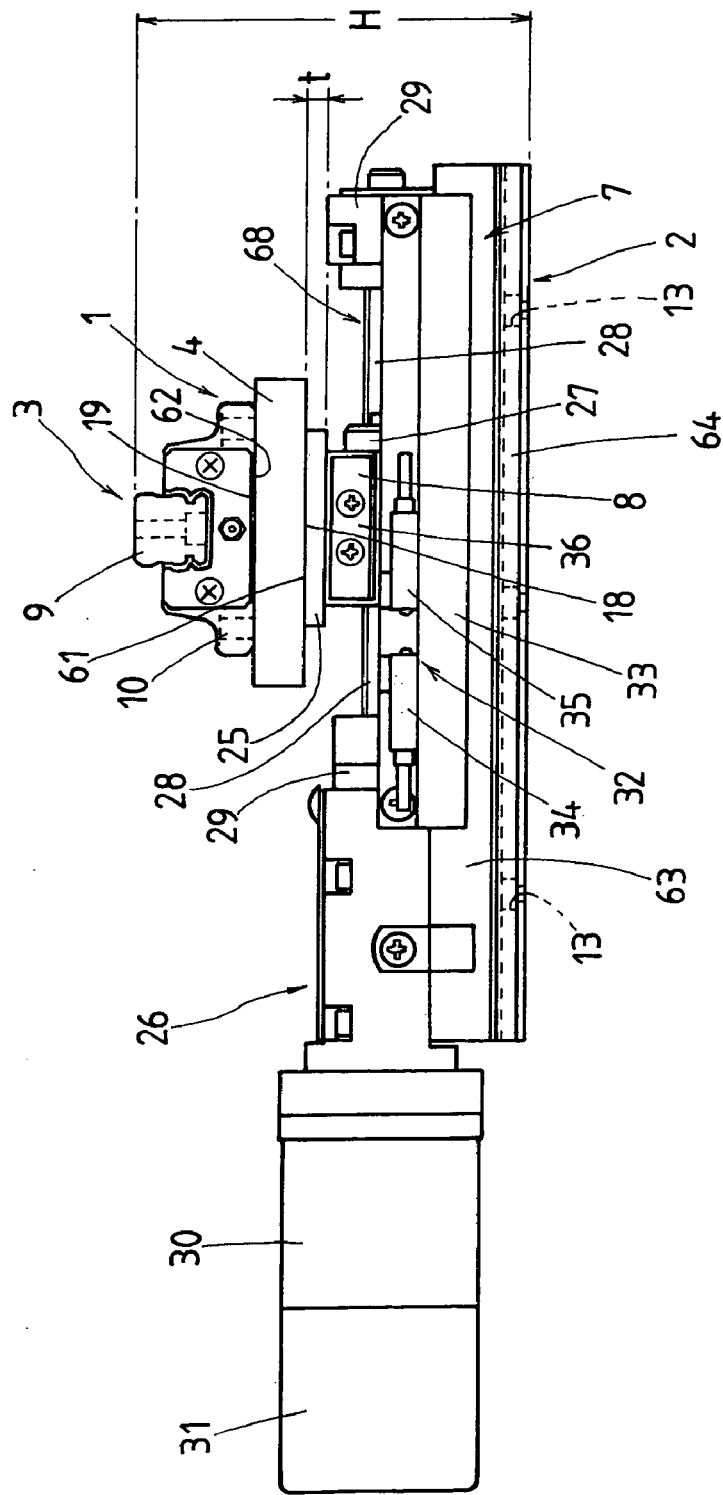
FIG. 7 is a front elevation of the biaxial linear-revolving guide unit associated with a driving means.

The first slider 8, as shown in FIG. 7, has a space adjuster 25 on its mating surface 61 facing on to the revolving bearing 4 to adjust a distance between the first and second linear motion guide units 2, 3. While the biaxial linear-revolving guide unit 1 of the present invention features that the revolving bearing 4 is attached directly to the sliders 8, 10, but if one consider that the slider is constructed to include the space adjuster 25 therein, the direct attachment of the revolving bearing 4 could be true for the slider 8 with the space adjuster 25. That is to say, the direct attachment of the revolving bearing 4 to the slider 8 could refer to including the construction in which there is interposed the space adjuster to regulate the overall height H of the biaxial linear-revolving guide unit 1.

Figure 9:
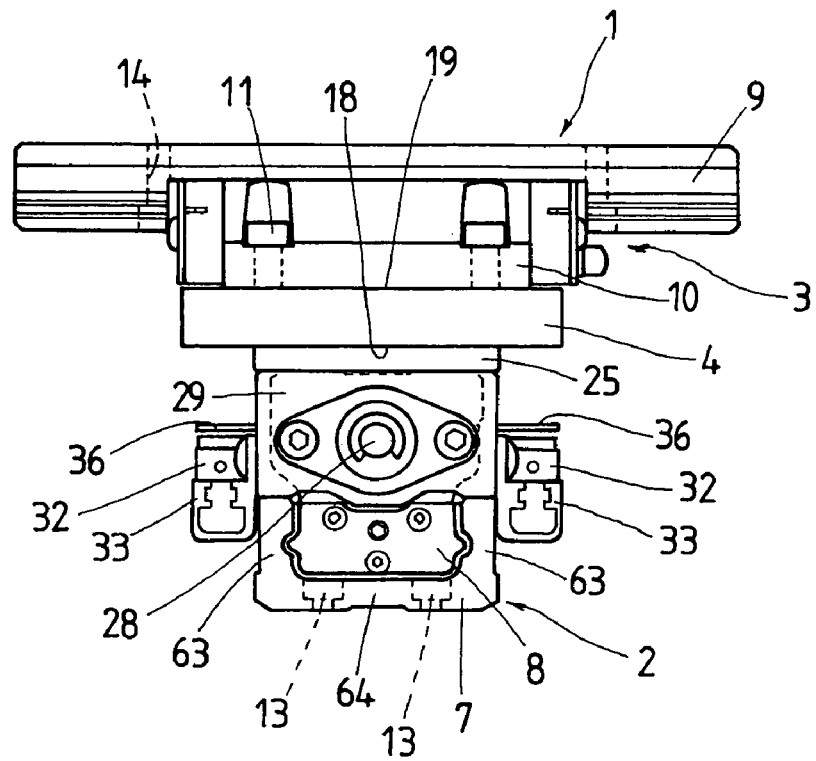
FIG. 9 is a side elevation of the biaxial linear-revolving guide unit illustrated in FIG. 7.
Figure 10:
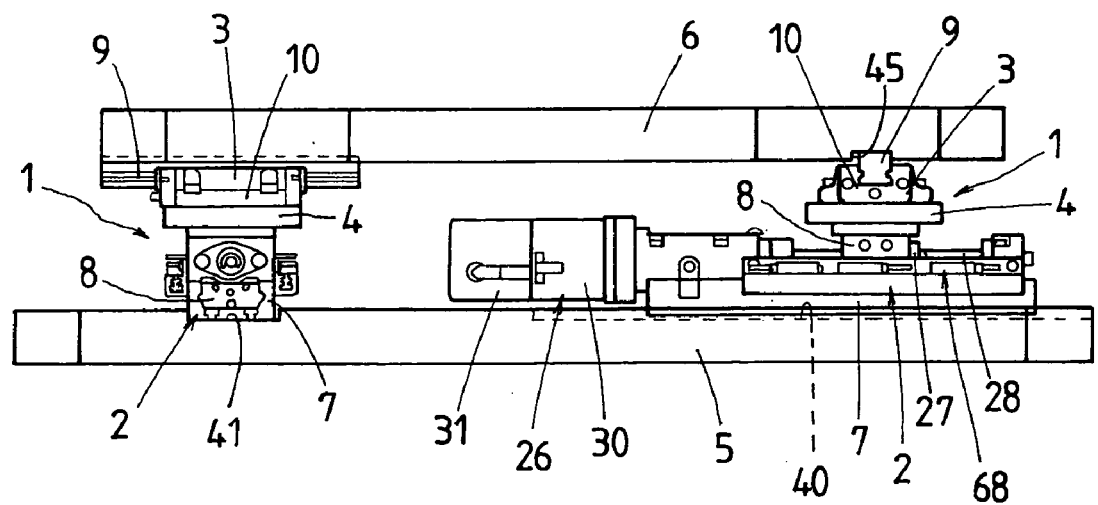
FIG. 10 is a front elevation showing a table system having installed therein with the biaxial linear-revolving guide unit of the present invention.

Now referring to FIG. 9 where the linear motion guide units 2, 3 are illustrated, the linear motion guide unit 2 has the guide rail 7 made in a U-shape in transverse section of sidewise opposing side walls 63 joined together with a bottom wall 64, and the slider 8 fit for linear movement between the side walls 63 of the guide rail 7. With the biaxial linear-revolving guide unit 1 of the embodiment discussed here, both the sliders 8 and 10 are always kept in alignment on a common axis through the revolving bearing 4, irrespective of the shift of the guide rail 7 with respect to the slider 8 and/or the shift of the guide rail 9 with respect to the slider 10. Thus, the biaxial linear-revolving guide unit 1, as experiencing no variation in the center of loads, is hard to undergo any lopsided load, suited well for the operation of precise position-control.

Figure 8:
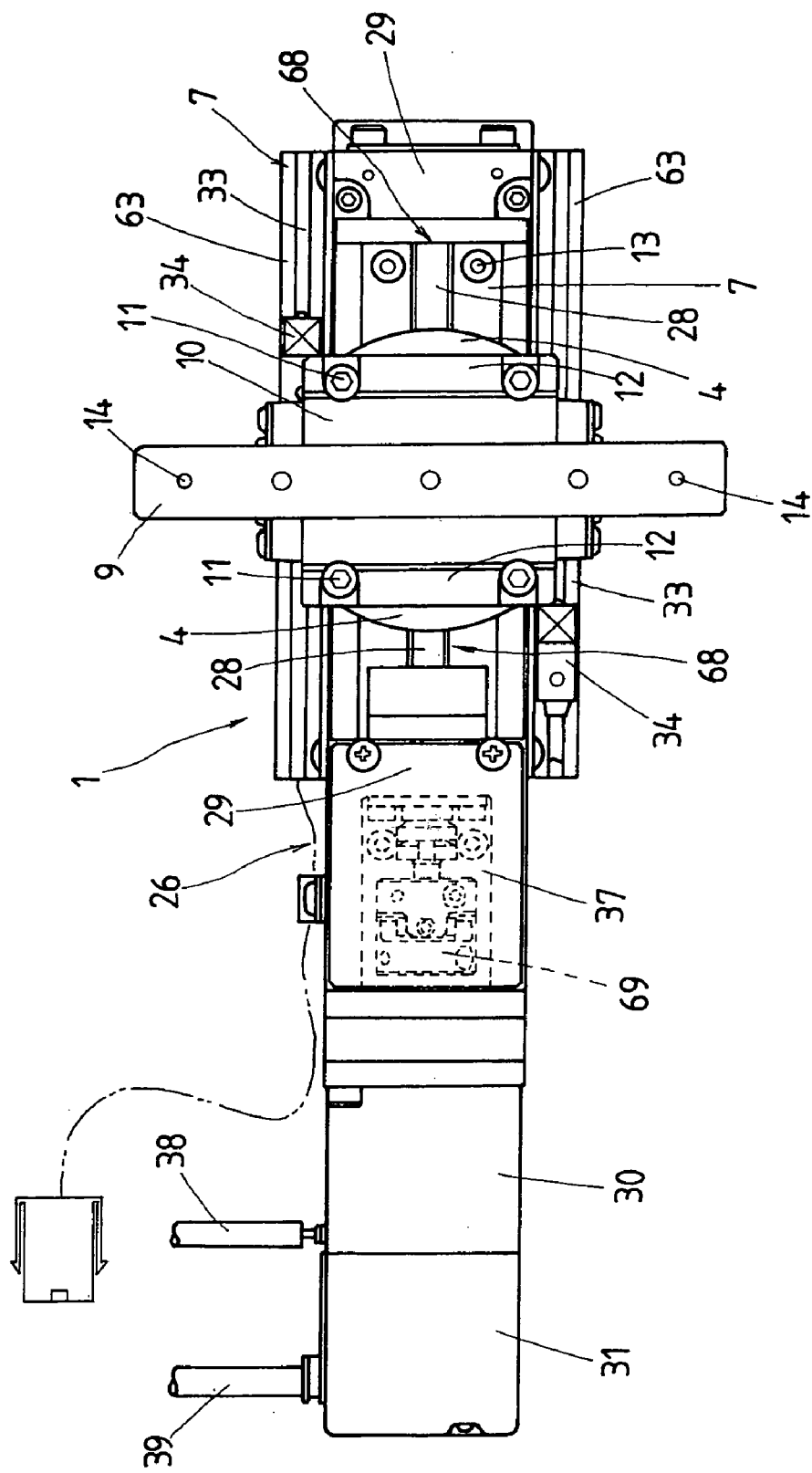
FIG. 8 is a top plan view of the biaxial linear-revolving guide unit illustrated in FIG. 7.

As an alternative, the biaxial linear-revolving guide unit 1 of the present invention, as shown in FIGS. 7 to 9, may be constructed in combination with any driving means 26. The biaxial linear-revolving guide unit 1 is associated with the driving means 26 to force the slider 8 to move relative to the guide rail 7 towards any desired position. The driving means 26 is composed of, for example a ball screw 68, a motor 30 such as an AC servomotor or the like, and an encoder 31. The motor 30 is connected with an electric wire 38 while the encoder 31 is communicated with a line for signal and electric power. The ball screw 68 is made up of a lead screw 28 and a lead nut 27. The lead screw 28 lies lengthwise inside the sidewise opposing side walls 63 of the guide rail 7, with being born for rotation against supporting blocks 29 at forward and aft ends of the guide rail 7 while the lead nut 27 fits over the lead screw 28 for linear movement by virtue of rolling elements of balls and joins with the slider 8. With the guide rail 7 of U-shape in transverse section, the ball screw 68 of the driving means 26 is allowed lying midway between the sidewise opposing side walls 63 to come into alignment with the center of load, thereby making sure of steady operation.

The motor of the AC servomotor has a driving shaft 69 that is connected at one end thereof to the lead screw 28 through a coupling 37 and at another end thereof to the encoder 31. With the biaxial linear-revolving guide unit 1 constructed as stated earlier, the slider 8 is controlled to move freely towards any desired position. On lengthwise inside surfaces of the sidewise opposing side walls 63 of the guide rail 7, there are provided sensor rails 33, one to each wall, which have thereon sensors 32 including a limit sensor 34, a before-origin sensor 35, and so on to sense screens 36 on the sides of the slider 8, sending signals.

With the embodiment discussed now, the space adjuster 25 interposed between the slider 8 and the revolving bearing 4 makes it easy to get all the biaxial linear-revolving guide units 1 even with one another in the overall height H. The space adjuster 25, after having machined to a desired thickness t with using surface grinding and so on, may be introduced simply into the biaxial linear-revolving guide unit 1. As an alternative, the space adjuster 25 may be installed between the second slider 10 and the revolving bearing 4.

Referring next to FIGS. 10 to 24, there is shown a table system having incorporated therein with the biaxial linear-revolving guide unit 1 of the present invention. The table system has more than one biaxial linear-revolving guide unit 1, four units in FIG. 11, which is installed between a stationary bed 5 and a moving table 6, both of which are made of a plate rectangular in top plan view. The bed 5 is made with bolt holes 47 that are used to fasten the plate to any other component such as a machine bed and so on while the table 6 is also made with threaded holes 49 used to any other parts thereto, and bolt holes 48 in which fastening bolts 57 fit to secure the table 6 to an associated guide rail 9.

The table system for position control of the present invention has at least three sets of the biaxial linear-revolving guide unit 1 with the driving means 26, and more than one biaxial linear-revolving guide unit 1 with no driving means. As an alternative, the table system may be constituted with only at least three sets of the biaxial linear-revolving guide unit 1 with the driving means 26. With the embodiment shown in FIG. 11 and discussed here, there are provided three sets of the biaxial linear-revolving guide unit 1 with the driving means 26, and one biaxial linear-revolving guide unit 1 with no driving means, all of which are placed at their associated installation areas 44 on the bed 5 to lie between the table 6 and the bed 5. Of the three sets of the biaxial linear-revolving guide unit 1 associated with the driving means 26, any two units are fit at their one guide rail into grooves 40 cut into the installation areas 44 on the bed 5 in parallel with one another in X-direction, and at the other guide rail into a groove 46 cut into table 6 in Y-direction. The third set of the biaxial linear-revolving guide unit 1 combined with the driving means 26 is arranged to fit at one guide rail thereof into a groove 44 cut into the bed 5 in Y-direction, and at the other guide rail into a pair of grooves 45 cut into table 6 in X-direction.

With the table system constructed as stated earlier, the three sets of the biaxial linear-revolving guide unit 1 support predominantly the load applied to the table 6, helping render the table tough in stiffness and keep precise position-control during the travel of the table 6. Unlike the table system of the present invention constructed as stated earlier, conventional table systems commonly has no construction of three-point mounting. With such conventional table systems, accordingly, the biaxial linear-revolving guide unit 1 may end up experiencing moment of load as the table travels largely in any of X-, Y- and θ-directions, whereby the table would undergo variation in stiffness. This means that the conventional table systems should not be able to get the table moving over the large amount of travel in any of X-, Y- and θ-directions and therefore limited within a narrow range in travel. Contrary to this, the table system of the present invention, because of three-point mounting construction using the three sets of the biaxial linear-revolving guide unit 1, is allowed to make certain of large amount of travel whenever the design can admit of it.

With the embodiment explained here, moreover, the grooves 41, 46 in Y-direction are cut so as to come into line with each other. The biaxial linear-revolving guide unit 1 with no driving means fits at one guide rail thereof into the groove 41 cut into the bed 5 to extend in Y-direction perpendicular to the paired grooves 40, and at the other guide rail into any one of paired grooves 45 cut into the table 6 to lie in perpendicular to the groove 41 on the bed 5. With the table system constructed as stated just earlier, thus, the biaxial linear-revolving guide unit 1 with no driving means is oriented in Y-direction perpendicular to the paired set of the biaxial linear-revolving guide unit 1 with the driving means 26 while also arranged in line with the third set of the biaxial linear-revolving guide units 1 with driving means 26, thereby making sure of steady support for the table 6. Having explained a specific embodiment in which the biaxial linear-revolving guide unit 1 with no driving means fits at one guide rail thereof into the groove 41 cut into the bed 5 to extend in Y-direction, and at the other guide rail into the groove 45 cut into the table 6 in X-direction, it is believed obvious that the biaxial linear-revolving guide unit with no driving means can be disposed at any desirable orientation with taking into account the table stiffness and the load exerted on the table. As an alternative, the biaxial linear-revolving guide unit 1 with no driving means needs not assembled in the table system. For some instances, it will be appreciated that more than one set of the biaxial linear-revolving guide unit 1 with no driving means may be incorporated in the table system. Moreover, the orientation or arrangement of some sets of the biaxial linear-revolving guide unit 1 can be selected depending on what position-control fashion is needed for the table system. The specific arrangement as stated earlier of the biaxial linear-revolving guide unit 1 is envisaged making the position control of the table 6 in any of X-, Y- and circular θ-directions easier.

Figure 13:
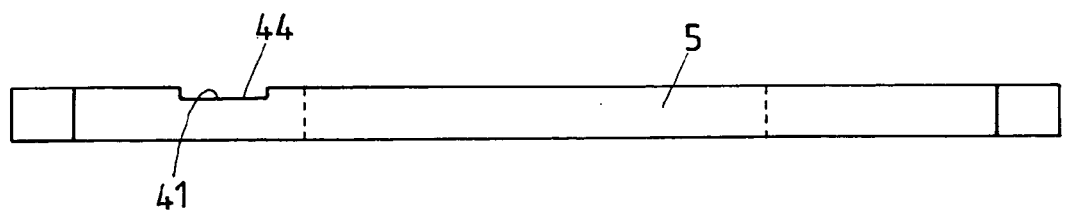
FIG. 13 is a front elevation of a stationary bed used in the table system of FIG. 10.
Figure 14:
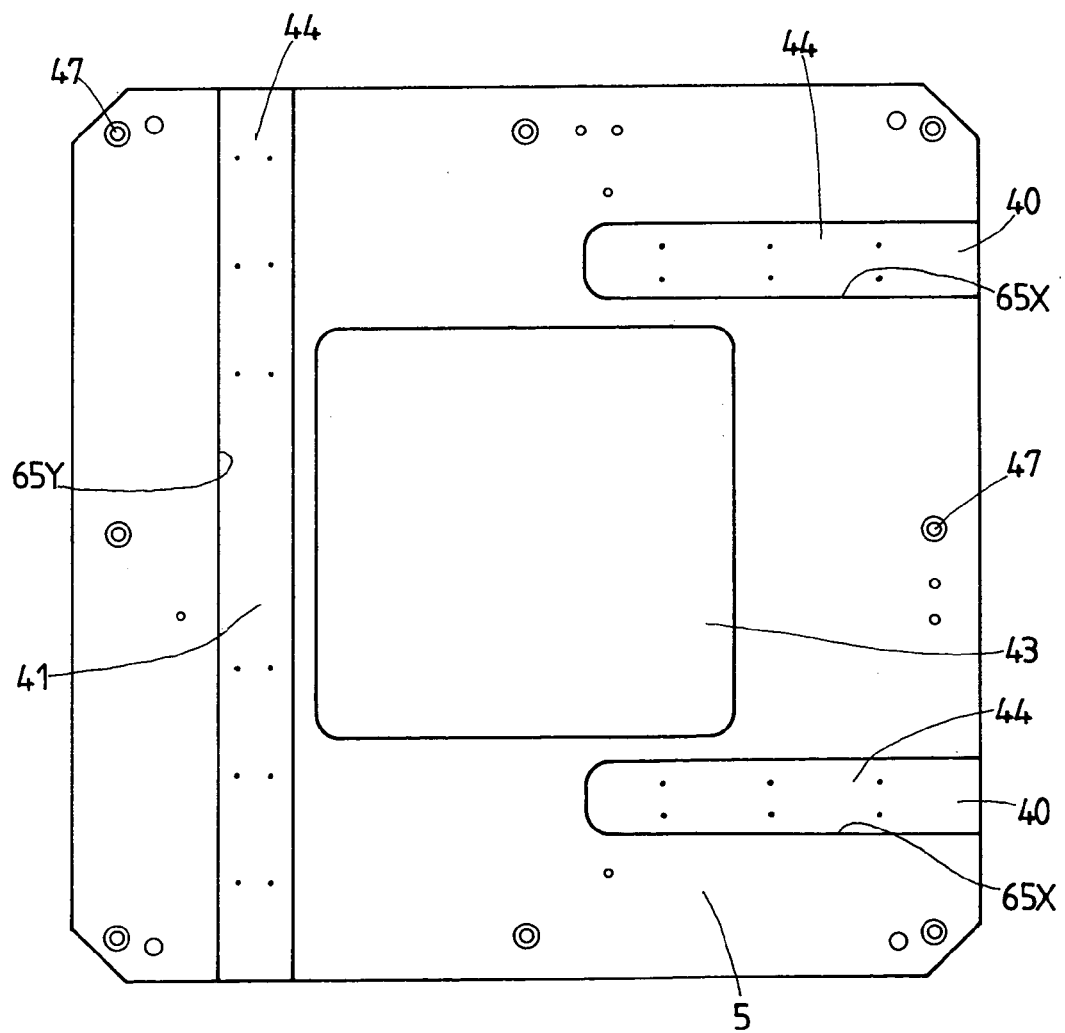
FIG. 14 is a top plan view of the bed of FIG. 13.
Figure 15:
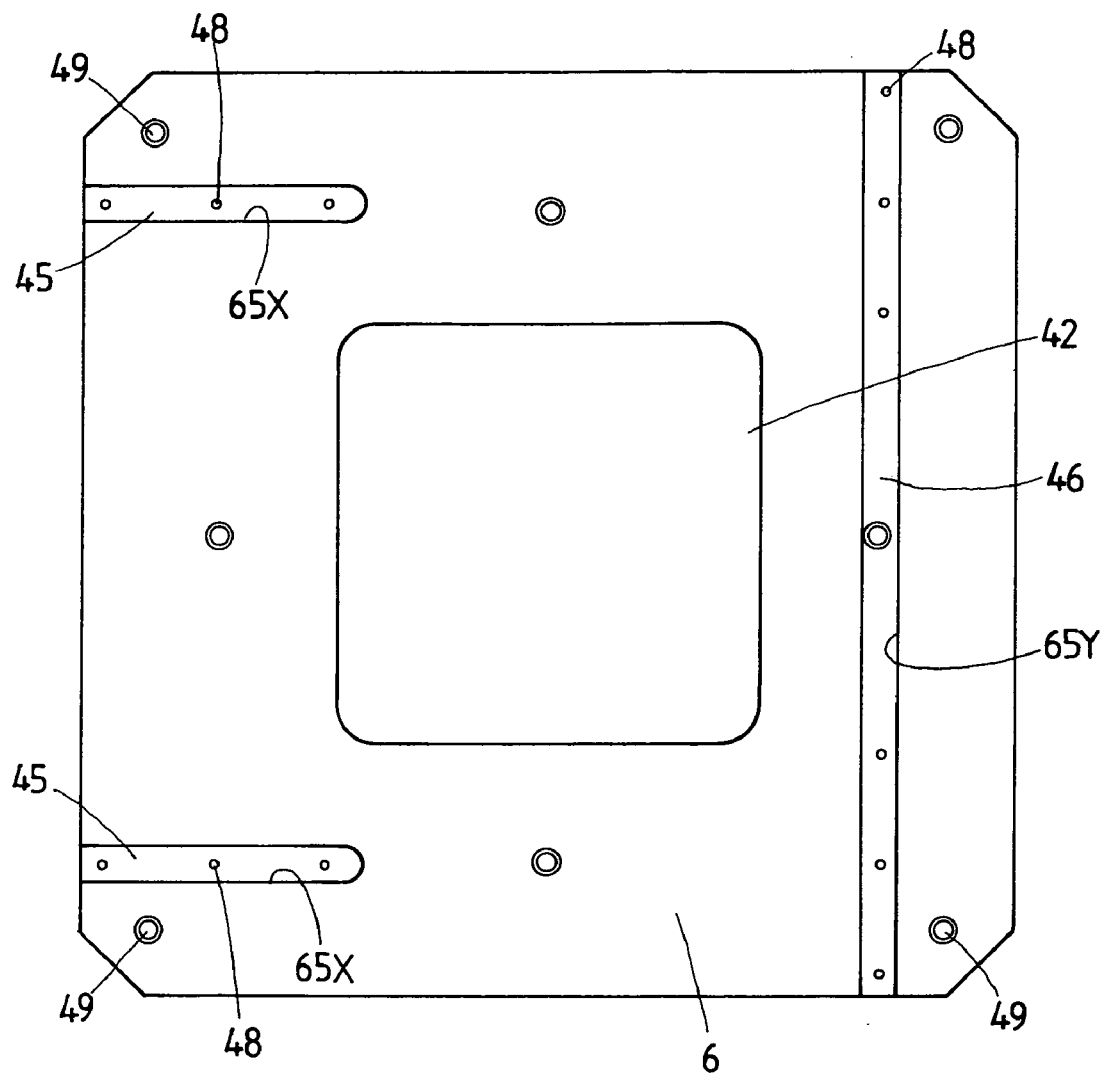
FIG. 15 is a bottom plan view showing the table to be incorporated in the table system of FIG. 10.

The table system according to the present invention, as seen in FIGS. 13 to 15, has fitting surfaces 65 of reference on both of the bed 5 and the table 6. Any one sides 65X, 65Y inside the grooves 40, 41 cut into the bed 5 and the table 6 are formed in the fitting surfaces 65 of reference. The bed 5, as shown in FIG. 14, has the grooves 40 cut in a fashion spaced away from one another at a preselected interval and extended in X-direction in parallel relation, and the groove 41 cut in a way extended in Y-direction perpendicular to the X-direction. Any one of the widthwise-opposing sides inside the groove 41 is finished into the fitting surface 65X of reference, which is used to fit precisely the first guide rail 7 into the associated groove 41. Any one side inside the groove 41 is finished into the fitting surface 65Y of reference, which is used for precise fit of the guide rail 7 into the associated groove 40. On the bottom surface of the table 6, as shown in FIG. 15, there are made the grooves 45 cut at a location facing on to the groove 41 on the bed 5 in a fashion spaced away from one another at a preselected interval and extended in X-direction in parallel relation, and the groove 46 cut at a location facing on to the groove 40 on the bed 5 in a way extended in Y-direction perpendicular to the X-direction. Any one of the widthwise-opposing sides inside the groove 45 is finished into the fitting surface 65X of reference, which is used for precise fit of the second guide rail 9 into the associated groove 45. Any one side inside the groove 46 is finished into the fitting surface 65Y of reference, which is used for precise fit of the second guide rail 9 into the associated groove 46.

Figure 11:
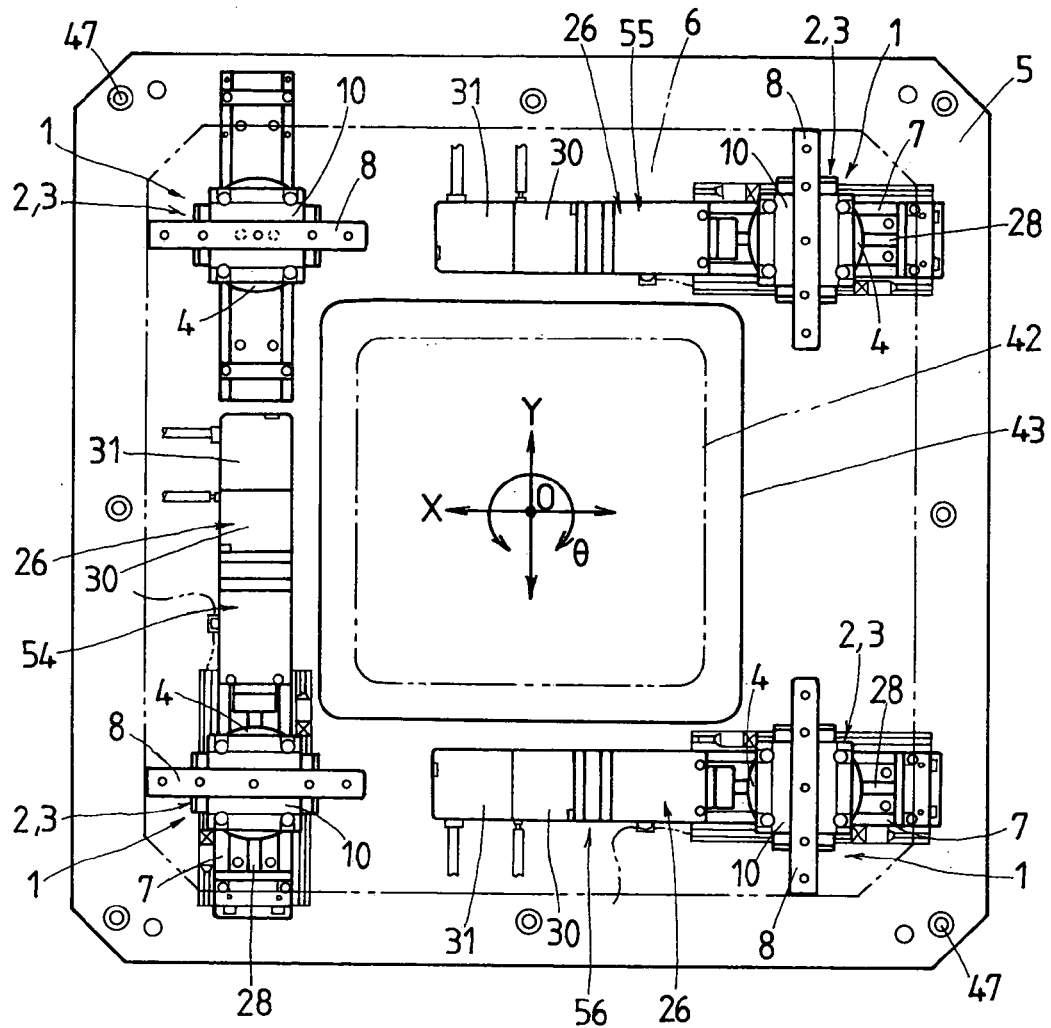
FIG. 11 is a top plan view of the table system shown in FIG. 10, but a top table being removed.
Figure 12:
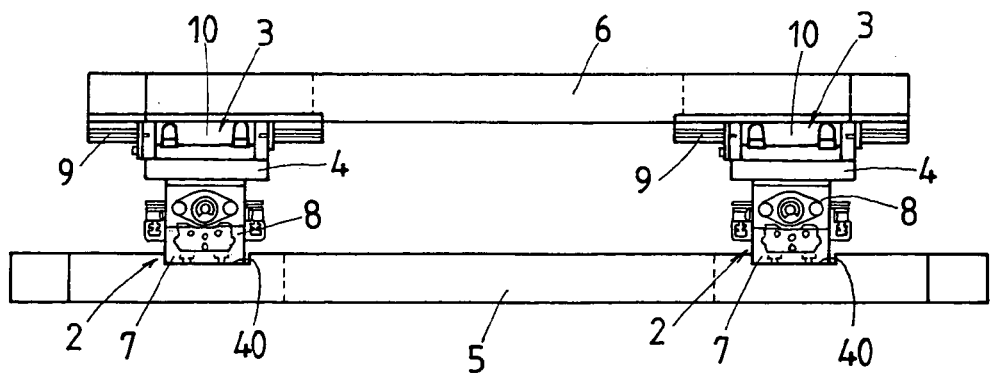
FIG. 12 is a side elevation showing the table system of FIG. 10.

With the table system shown in FIG. 11, a pair of the biaxial linear-revolving guide units 1 fit into the grooves 40 cut in the bed 5 in X-direction, one to each groove, is combined with the driving means 26 while the third biaxial linear-revolving guide unit 1 fit into the groove 41 cut in the bed 5 in Y-direction is also combined with the driving means 26. The biaxial linear-revolving guide units 1 are installed between the bed 5 and the table 6 with the first guide rails 7 being associated with the bed 5 while the second guide rails 9 being associated with the table 6. With the construction as stated just earlier, the biaxial linear-revolving guide units 1 are position precisely in matching with the square location of reference, as shown in FIG. 11.

The provision of the fitting sides 65X, 65Y of reference made on the bed 5 and the table 6 as stated earlier helps put the linear motion guide units 2, 3 with accuracy on the location of reference, thereby making it easier to set the table system on the position of reference, contributing to the provision of the table system that allows highly precise position-control.

As an alternative to the fitting surfaces 65X, 65Y of reference made inside the grooves 40, 41 cut in the bed 5 and inside the grooves 45, 46 cut in the table 6 in the specific embodiment of the table system as stated earlier, either fixed blocks 50, 51 of reference or fixed pins 52, 53 of reference may be used.

Figure 17:
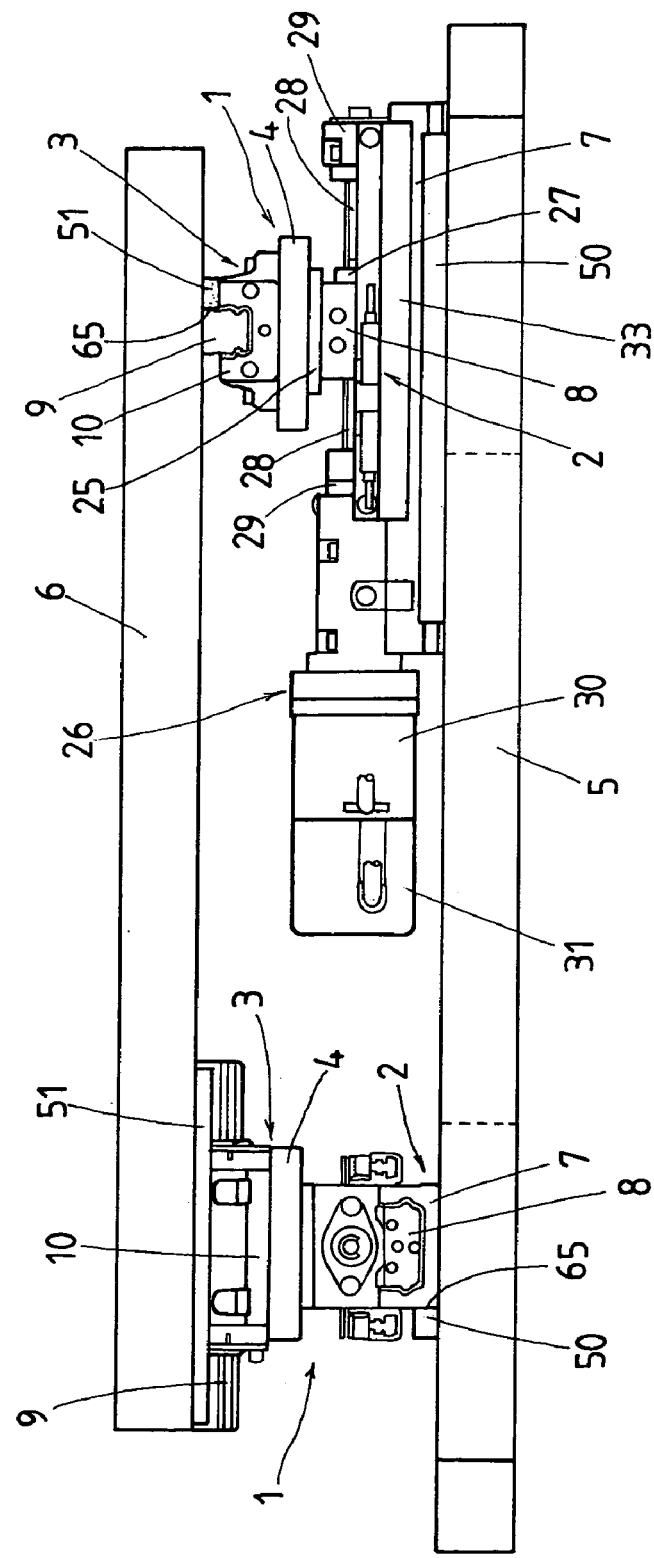
FIG. 17 is a front elevation of the table system of FIG. 10 to exemplify how the biaxial linear-revolving guide unit of the present invention is incorporated in the table system.

In the table system shown in FIG. 17, the fixed block 50 of reference having on one side thereof the fitting surface 65X of reference lies on the bed 5 along the associated groove 40 cut in the bed 5 while another fixed block 50 of reference having on one side thereof the fitting surface 65Y of reference lies on the bed 5 along the associated groove 41 cut in the bed 5. On the other hand, the fixed block 51 of reference having on one side thereof the fitting surface 65X of reference is placed on the table 6 along the associated groove 45 cut in the table 6 and another fixed block 51 of reference having on one side thereof the fitting surface 65Y of reference lies on the table 6 along the associated groove 46 cut in the table 6.

Figure 18:
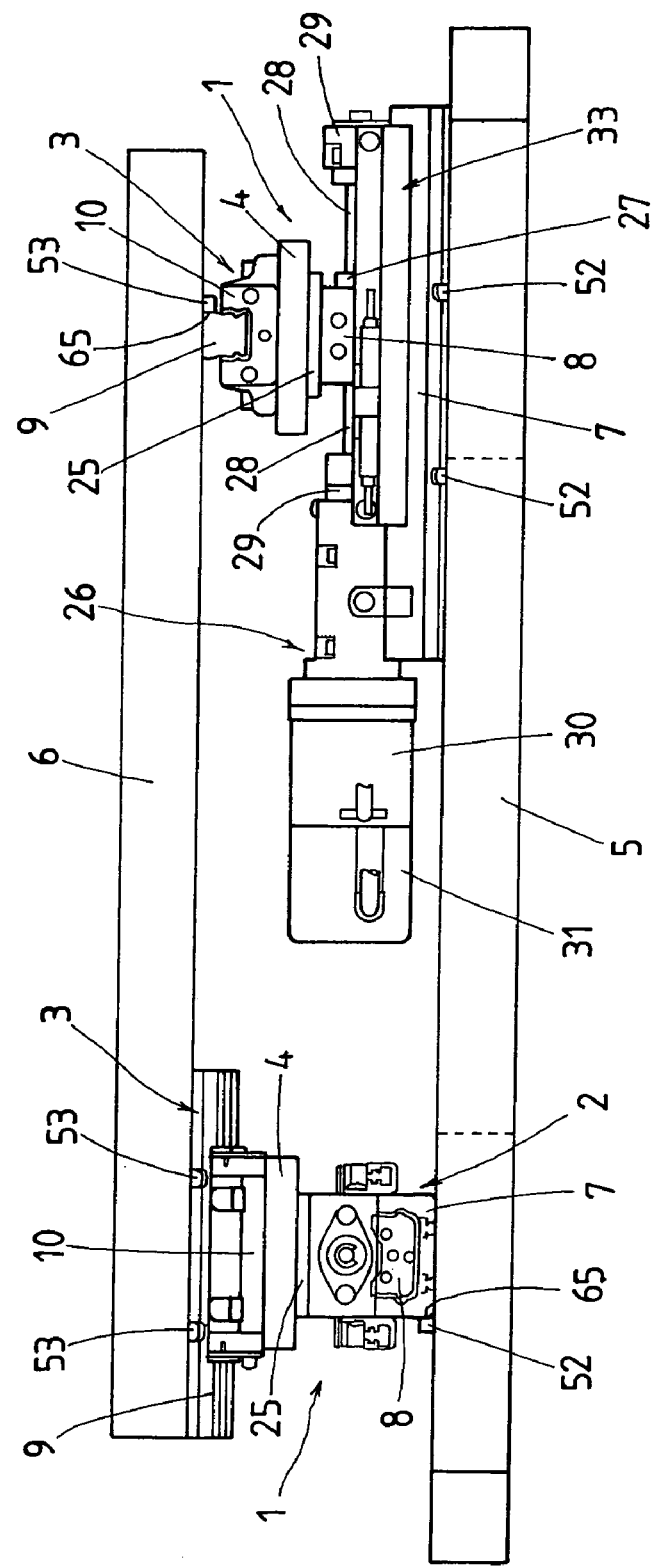
FIG. 18 is a front elevation of the table system of FIG. 10 to illustrate another example of assembly of the biaxial linear-revolving guide unit into the table system.

With the modified table system shown in FIG. 18, the fixed pin 50 of reference having on one side thereof the fitting surface 65X of reference lies on the bed 5 in facing the associated groove 40 cut in the bed 5 while another fixed pin 52 of reference having on one side thereof the fitting surface 65Y of reference lies on the bed 5 in facing the associated groove 41 cut in the bed 5. On the table 6, there are provided the fixed pin 53 of reference having on one side thereof the fitting surface 65X of reference, which faces the associated groove 45 cut in the table 6, and another fixed pin 53 of reference having on one side thereof the fitting surface 65Y of reference, which faces the associated groove 46 cut in the table 6.

Figure 16:
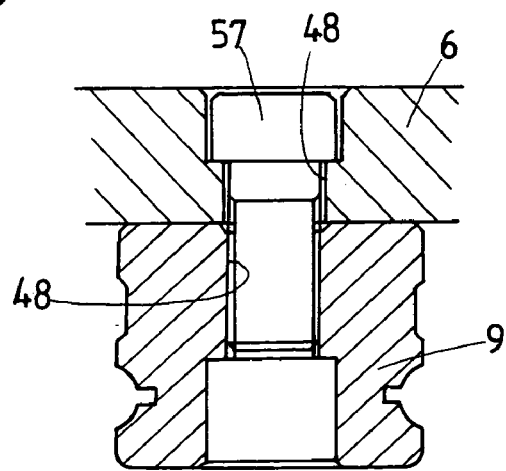
FIG. 16 is a fragmentary sectional view illustrating how the table of FIG. 15 is fastened to a guide rail.

Joining the table 6 together with the biaxial linear-revolving guide unit 1, once assembled with the bed 5, may be easily carried out without getting interference from other components by only applying the fastening bolt 11 from the outside as shown in FIG. 16.

Thus, assembly of the biaxial linear-revolving guide units with the bed 5 and the table 6 can be conducted accurately, with even ease, by simple procedures as stated just above to finish the table system that is able to provide highly accurate position control. With the table system of the present invention, moreover, the bed 5 of rectangular configuration has a window 43 at the central area thereof while the table 6 of rectangular configuration has a window 42 at the central area thereof. Both the bed 5 and the table 6 are entirely coated with black skin, which is effective to contain irregular radiation that might otherwise be undesirable for optical inspection equipment or the like. In addition, because the biaxial linear-revolving guide units, including their driving means, are entirely incorporated in the table system, the overall construction is substantially within the area of the table 6 as illustrated in FIG. 11, so that the table system is made compact in construction, even with precise in position-control.

Finally referring to FIGS. 19 to 24 there is illustrated how the table system of the present invention operates.

Of the linear motion guide units installed on the bed 5, three units are combined with the driving means, one to each unit, to force the table 6 towards any desired location relative to the bed 5. For convenience of explaining the operational modes of the table system, the three driving means 26 are each referred to a first X-axis driver 55 assigned any one of the paired grooves 40, a second X-axis driver 56 assigned to the other 40, and a Y-axis driver 54 assigned to the groove 41. Getting the table 6 to move relative to the bed 5 towards any desired location in any of X-direction moving mode, and Y-direction moving mode, or askew moving mode in XY-coordinates, turning mode on its center axis and angular shift mode on an axis of moment vector in XY-coordinates is controlled by selective actuation of any of the first X-axis driver 55, second X-axis driver 56 and Y-axis driver 54 to determine both the moving directions and moving amounts of the sliders 8 associated with the drivers. The relative movement caused among the sliders 8 forces the revolving bearing 4 to turn, getting the second guide rail 9 of the second linear motion guide unit 3 to make a turnaround relative to the first guide rail 7 while causing the second slider 10 to move relative to the associated guide rail 9, thereby resulting in accurate position-control of the table 6 into any desired position relative to the bed 5.

Figure 19:
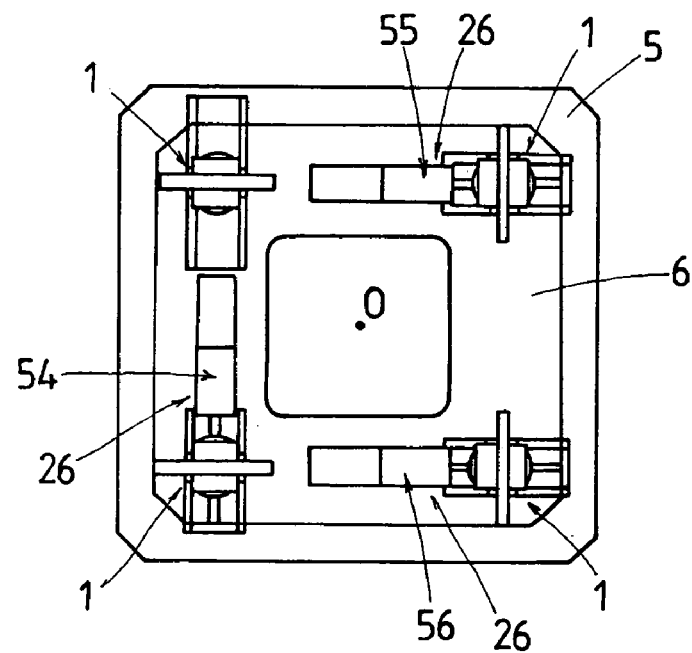
FIG. 19 is a schematic illustration of the table system of FIG. 10 at a reference location among operational modes.

In FIG. 19, the table 6 is shown at a location of reference relative to the bed 5. With this situation or operational mode, the first X-axis driver 55, second X-axis driver 56 and Y-axis driver 54 are all in inoperative while the biaxial linear-revolving guide unit 1 lies on a position of reference or an origin O where the geometric centers of the bed 5 and the table 6 are in alignment with one another.

Figure 20:
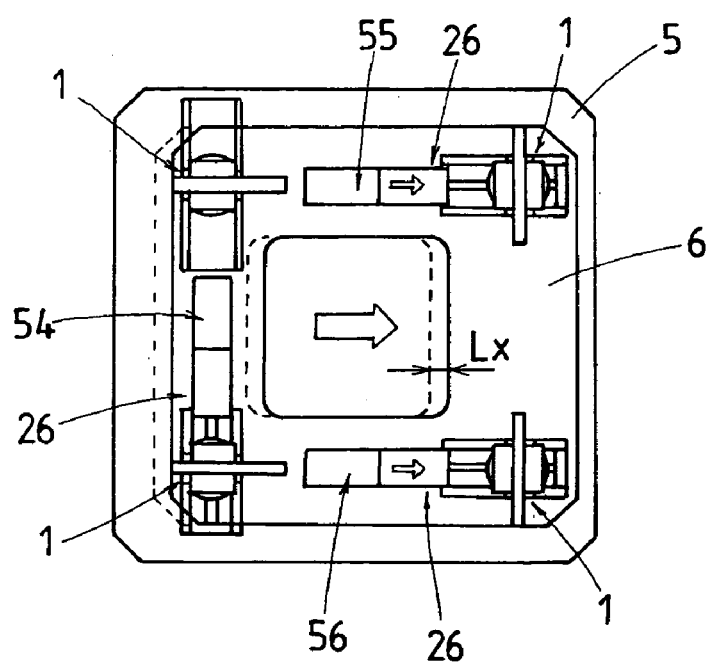
FIG. 20 is a schematic illustration of the table system of FIG. 10 in an X-mode among operational modes, where the table moves in an X-direction.

When forcing the table 6 to move relatively to the bed 5 in the X-direction as shown in FIG. 20, the first and second X-axis drivers 55, 56 are actuated while the Y-axis driver 54 remains inoperative. As a result, a pair of the biaxial linear-revolving guide units 1 is forced in synchronized relation with one another by the same amount of movement from the position of reference in the X-direction as shown by an arrow, getting the table 6 moved relative to the bed 5 by a desired distance Lx in the X-direction.

Figure 21:
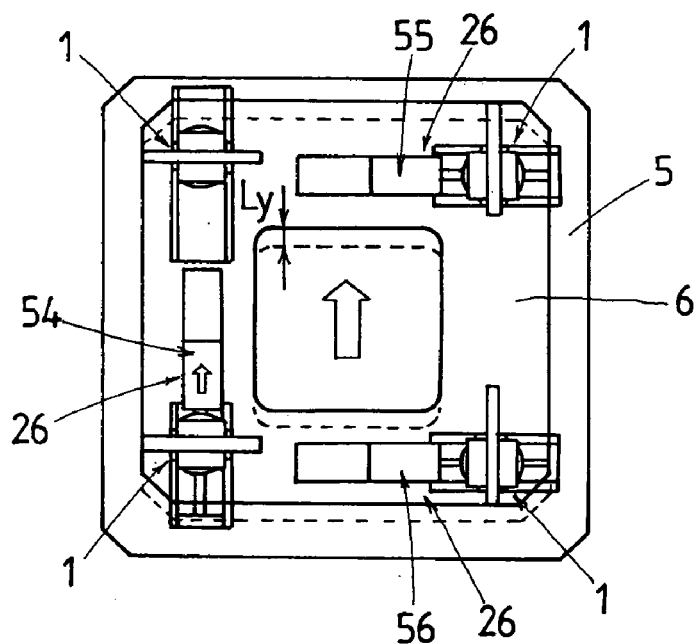
FIG. 21 is a schematic illustration of the table system of FIG. 10 in a Y-mode among operational modes, where the table moves in a Y-direction.

On a Y-mode operation of the table system where the table 6 is shifted relative to the bed 5 in the Y-direction as shown in FIG. 21, the first and second X-axis drivers 55, 56 are both kept inoperative while only the Y-axis driver 54 is energized. The biaxial linear-revolving guide unit 1 is driven by a preselected amount of movement from the position of reference in the Y-direction as shown by an arrow, getting the table 6 moved relative to the bed 5 by a predetermined distance Ly in the Y-direction.

Figure 22:
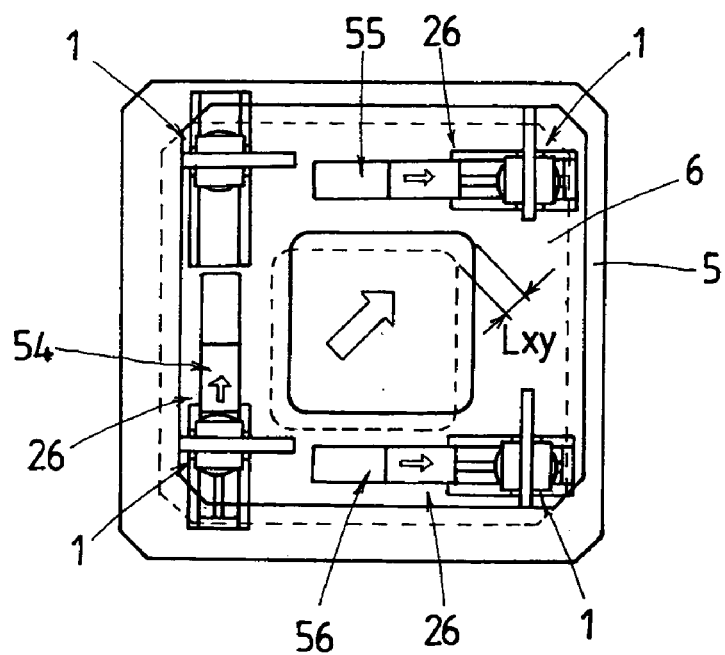
FIG. 22 is a schematic illustration of the table system of FIG. 10 in an XY-mode among operational modes, where the table moves askew in XY-coordinates.

On an XY-mode operation of the table system where the table 6 travels askew in XY-coordinates relative to the bed 5 as shown in FIG. 22, the first and second X-axis drivers 55, 56 are actuated and at the same time the Y-axis driver 54 is energized. As a result, a pair of the biaxial linear-revolving guide units 1 is forced in synchronized relation with one another by the same amount of movement from the position of reference in the X-direction as shown by an arrow while the third biaxial linear-revolving guide unit 1 is driven to move the slider 8 by a desired amount of movement from the position of reference in the Y-direction as shown by an arrow, whereby the table 6 is moved askew in the XY-coordinates relative to the bed 5 by a desired distance Lxy.

Figure 23:
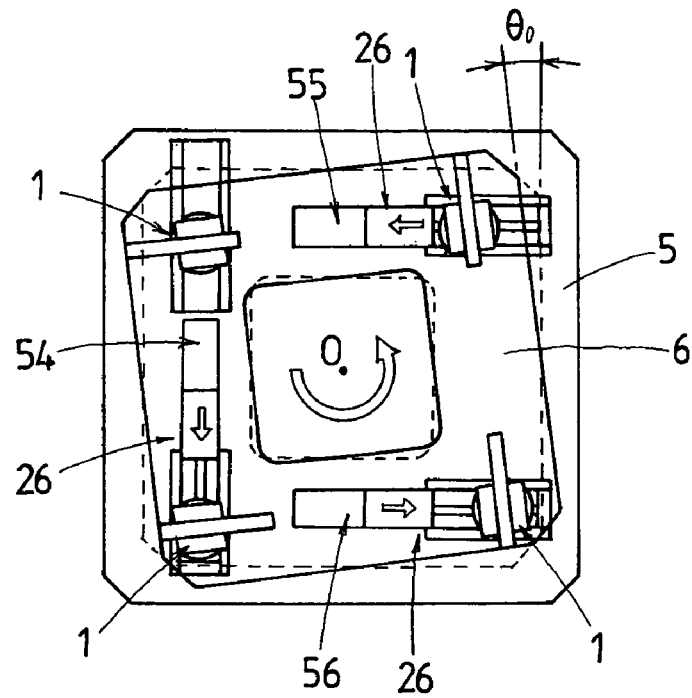
FIG. 23 is a schematic illustration of the table system of FIG. 10 in a circular mode among operational modes, where the table turns on its own center axis in XY-coordinates.

On a circular operation mode of the table system where the table 6 turns relatively to the bed 5 on its own center axis in the XY-coordinates as shown in FIG. 23, the first and second X-axis drivers 55, 56 are actuated in opposite directions as shown by an arrow along the X-axis while the Y-axis driver 54 is actuated in a direction along the Y-axis as shown by an arrow. Thus, the biaxial linear-revolving guide units 1 are driven in opposite directions along the X-axis by a preselected amount of movement from the position of reference as shown by an arrow and at the time the third biaxial linear-revolving guide units 1 forces the associated slider 8 to move by a preselected amount of movement in the Y-direction as shown by an arrow, thereby getting the table 6 turned relative to the bed 5 over a predetermined revolving angle $\theta_0$ on the center O of reference as shown by a curved arrow.

Figure 24:
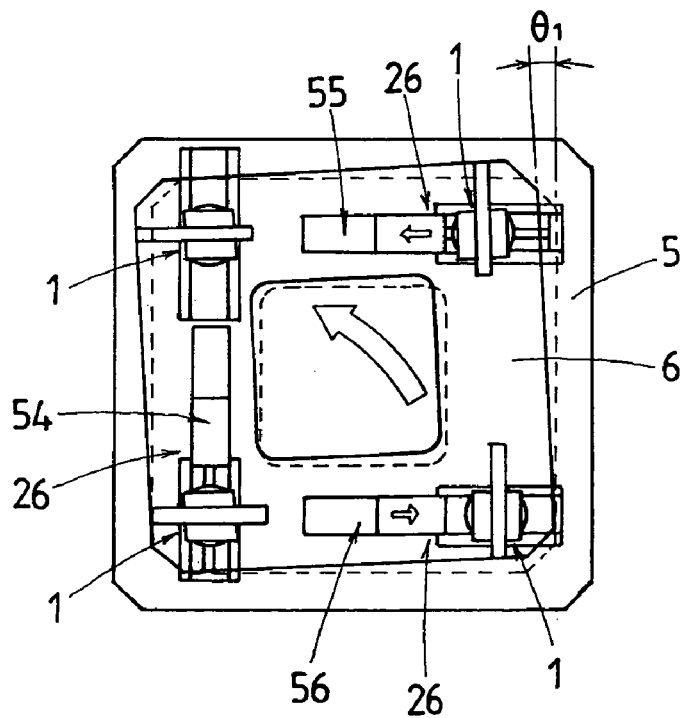
FIG. 24 is a schematic illustration of the table system of FIG. 10 in an angular shift mode among operational modes, where the table shifts on an axis determined by moment vector in XY-coordinates.

On an angular shift operation mode of the table system where the table 6 shifts relative to the bed 5 on an axis determined by moment vector in XY-coordinates, for example on a position of the biaxial linear-revolving guide unit 1 combined with the Y-axis driver 54 as shown in FIG. 24, the first and second X-axis drivers 55, 56 are actuated in opposite directions as shown by an arrow along the X-axis while the Y-axis driver 54 remains inoperative. Thus, the biaxial linear-revolving guide units 1 are driven in opposite directions along the X-axis by a preselected amount of movement from the position of reference as shown by an arrow and at the time the third biaxial linear-revolving guide units 1 forces the associated slider 8 to move by a preselected amount of movement in the Y-direction as shown by an arrow, thereby getting the table 6 turned relative to the bed 5 over a predetermined revolving angle $\theta_1$ on the biaxial linear-revolving guide unit 1 combined with the Y-axis driver 54 as shown by a curved arrow.

What is claimed is:

1. A biaxial linear-revolving guide unit; comprising a pair of linear motion guide units each composed of a guide rail and a slider fit over the guide rail for linear movement relative to the guide rail, and a revolving bearing installed between the linear motion guide units to joint them for revolving movement relative to one another;

wherein the revolving bearing is comprised of an inner ring, an outer ring fit over the inner ring for revolving movement relative to the inner ring, and a rolling element installed between the inner and outer rings; and wherein any one of the inner and outer rings is joined directly at any one of axially opposite ends thereof to the slider of any one linear motion guide unit while the other of the inner and outer rings is joined directly at any one of axially opposite ends thereof to the slider of the other linear motion guide unit.

2. A biaxial linear-revolving guide unit constructed as defined in claim 1, wherein the paired linear motion guide units are a first linear motion guide unit composed of a first guide rail and a first slider, and a second linear motion guide unit composed of a second guide rail and a second slider.

3. A biaxial linear-revolving guide unit constructed as defined in claim 1, wherein a space adjuster to regulate a clearance between the linear motion guide units is provided is provided on a surface of the slider, which faces any one of axially opposite mating surfaces of the revolving bearing.

4. A biaxial linear-revolving guide unit constructed as defined in claim 1, wherein any one of the inner and outer rings is joined by more than one fastening bolt together with the mating surface of any one slider, which is a side opposite to other side that faces the associated guide rail.

5. A biaxial linear-revolving guide unit constructed as defined in claim 4, wherein more than one fastening bolt is four in number.

6. A biaxial linear-revolving guide unit constructed as defined in claim 1, wherein the inner ring of the revolving bearing is made with a counter-bored hole into which a fastening bolt fits to join the inner ring to any one of the sliders while the outer ring of the revolving bearing is made with a threaded hole into which a threaded bolt, after having extended through a hole in the other slider, fits to fasten the outer ring to the other slider.

7. A biaxial linear-revolving guide unit constructed as defined in claim 1, wherein the revolving bearing is constituted with a crossed-roller bearing composed of the inner ring, outer ring and more than one rolling element, which are all assembled into an integral construction.

8. A biaxial linear-revolving guide unit constructed as defined in claim 7, wherein the crossed-roller bearing is constructed in such a way that the inner ring fits into the outer ring to shift one another in an axial direction, whereby a mounting surface of the inner ring facing onto a mating surface of the first slider is raised above the outer ring while a mounting surface of the outer ring facing onto a mating surface of the second slider is raised above the inner ring in an axially opposite direction.

9. A biaxial linear-revolving guide unit constructed as defined in claim 1, wherein any one of the guide rails is joined to a bed of rectangular configuration while the other is joined to a table of rectangular configuration.

10. A biaxial linear-revolving guide unit constructed as defined in claim 9, wherein the guide rail to be joined with the table is made with a threaded hole and a fastening bolt, having passing through a hole in the table, fits into the threaded hole.

11. A biaxial linear-revolving guide unit constructed as defined in claim 9, wherein the linear motion guide unit joined to the table is combined with a driving means for position control of the slider.

12. A biaxial linear-revolving guide unit constructed as defined in claim 1, wherein the linear motion guide unit has the guide rail made in a U-shape in transverse section of sidewise opposing side walls joined together with a bottom wall, and the slider fit for linear movement between the side walls of the guide rail.

13. A biaxial linear-revolving guide unit constructed as defined in claim 1, wherein the linear motion guide unit has the guide rail of rectangular shape in transverse section, and the slider fit for linear movement over the guide rail.

14. A biaxial linear-revolving guide unit constructed as defined in claim 9, wherein the bed and the table each have a surface of reference, which is used to locate accurately the guide rail of the associated linear motion guide unit, and wherein the surface of reference is constituted with either a side surface of reference inside a groove cut into any one of the bed and the table or any one of a fixed block and a fixed pin of reference, which is fastened to any one of the bed and the table.

15. A table system; including a biaxial linear-revolving guide unit composed of a pair of linear motion guide units each having a guide rail and a slider allowed to move relative to the guide rail, and a revolving bearing installed between the linear motion guide units to allow the linear motion guide units to turn relative to one another;
wherein the revolving bearing is composed of an inner ring, an outer ring fit for circular movement into the outer ring, and a rolling element installed between the inner and outer rings;
wherein any one of the inner and outer rings is joined directly at any axial end thereof to the slider of any one of the linear motion guide units while the other is joined directly at any axial end thereof to the slider of the other linear motion guide units;
wherein more than one biaxial linear-revolving guide unit is installed between a table of rectangular configuration and a bed of rectangular configuration in opposition to the table; and
wherein the bed is provided thereon with a first X-axis installation area where any one of the linear motion guide units is joined to the bed with the guide rail thereof extending in an X-direction, and a first Y-axis installation area extending in a Y-direction normal to the X-direction, while the table is provided thereon with a second Y-axis installation area where the other linear motion guide unit is joined to the table with the guide rail thereof extending in the Y-direction normal to the first X-axis installation area, and a second X-axis installation area extending in the X-direction normal to the first Y-axis installation area.

16. A table system constructed as defined in claim 15, wherein a pair of the first X-axis installation areas is provided on the bed in such a way spaced away from one another in the Y-direction while a pair of the second X-axis installation areas is provided on the table in such a way spaced away from one another in the X-direction, and wherein the guide rails of the linear motion guide units fit in the first and second X-axis installation areas, one to each area.

17. A table system constructed as defined in claim 15, wherein the first Y-axis installation area is in line in the Y-direction on the bed while the second Y-axis installation area is in line in the Y-direction on the table, and wherein the guide rails of the paired linear motion guide units fit in the first and second Y-axis installation areas, one pair to each area.

18. A table system constructed as defined in claim 15, wherein the first X-axis installation area, second X-axis installation area, first Y-axis installation area and second Y-axis installation area each have a surface of reference, which is used to locate the guide rail of the associated linear motion guide unit, and wherein the surface of reference is constituted with either a side surface of reference inside a groove cut into any one of the bed and the table or any one of a fixed block and a fixed pin of reference, which is fastened to any one of the bed and the table.

19. A table system constructed as defined in claim 15, wherein the linear motion guide unit installed on the bed is comprised of the guide rail made in a U-shape in transverse section of sidewise opposing side walls joined together with a bottom wall, and the slider fit for linear movement between the side walls of the guide rail, while the other linear motion guide unit is composed of the guide rail of rectangular shape in transverse section, and the slider fit for linear movement over the guide rail.

20. A table system constructed as defined in claim 15, wherein of the linear motion guide units installed on the bed, three the units are combined with the driving means, one to each unit, to force the table towards any desired location relative to the bed.

21. A table system constructed as defined in claim 19 wherein the three driving means serves as a first X-axis driving means, a second X-axis driving means and a Y-axis driving means, respectively, which are selectively actuated to control not only an amount of movement but also a direction of movement of the table, thereby getting the table to move relative to the bed towards any desired location in any of X-direction moving mode, and Y-direction moving mode, or askew moving mode in XY-coordinates, turning mode on its center axis and angular shift mode on an axis of moment vector in XY-coordinates.

* * * * *